John Miller Impts in Harvesters.

117911

PATENTED AUG 8 1871

Attest
H. T. Dillon
A. Dollars

Inventor
John Miller

UNITED STATES PATENT OFFICE.

JOHN MILLER, OF SWAN, INDIANA.

IMPROVEMENT IN HARVESTER-REELS.

Specification forming part of Letters Patent No. 117,911, dated August 8, 1871.

*To all whom it may concern:*

Be it known that I, JOHN MILLER, of the town of Swan, in the county of Noble and State of Indiana, have invented certain new and useful Improvemements in Mechanism for Adjusting the Height of Reels for Harvesters; and the following is a full and exact description of the same, reference being had to the accompanying drawing making a part of this specification, in which—

Figure 2:
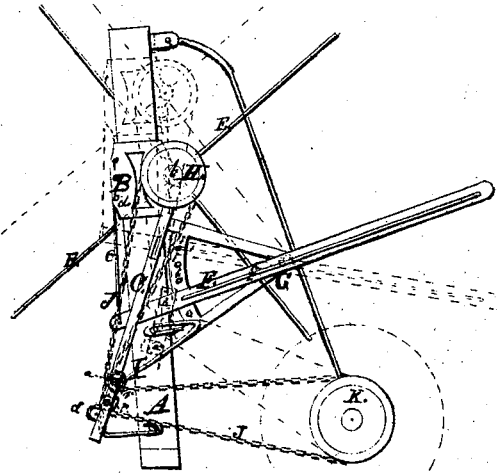
Figure 1:
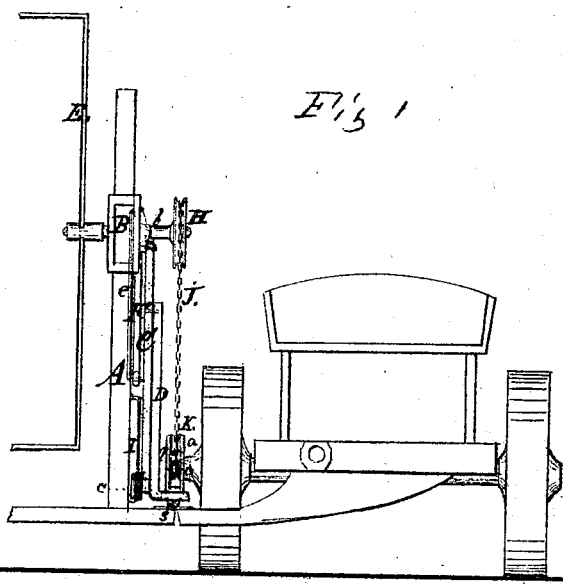

Figure 1 represents a front-view elevation of my adjustable reel mechanism. Fig. 2 shows a side elevation of the same.

The nature and object of my invention are to enable the driver or operator to adjust the height of the reel to the height of the grain being cut while sitting in his seat and the machine is in operation. My invention consists in the construction, the arrangement, and the combination of the parts and mechanism hereinafter more fully described, whereby the operator is enabled to raise and lower the reel at pleasure while sitting in his seat and the machine is in full operation.

To enable others to make and use my improvements, I will describe them more in detail, referring to the drawing and the letters thereon.

The post or standard A, to which the reel E is attached, is or may be secured to the finger-bar or inside shoe in such a manner as to bring the reel to its proper position. The journal $b$ upon which the reel rotates has its bearings in the slide B, which moves freely up or down on the standard or reel-post A a sufficient distance to be efficient for bringing either short or tall grain to the cutters. To the standard A is secured, at a suitable height from the finger-bar or shoe, a bracket or frame, G, to which the lever F is pivoted, it being placed in such a position as to be conveniently operated by the driver. The lever F is provided with a spring-catch, $f$, which takes into a segmental series of holes, $i\ i\ i\ i$, which forms a part of the bracket or frame G. To the front end of the said lever F is attached a rod, $e$, which connects the lever with the slide B for the purpose of raising or lowering the reel E. To the slide B is attached the adjustable bar C, in the lower end of which is placed a friction-roller, $c$, to bear upon an adjustable curved guide, I, so formed and arranged in relation to the reel-pulley H and driving-pulley K as to secure a uniform tension upon the chain or belt J, which operates the reel in any position which may be required. To the said bar C is attached an adjustable bar, D, provided with suitable bearings for pulleys $a\ a'$, under which the chain or belt J passes to revolve the reel E. The said pulley-bearings $r\ r$ are provided with a spring, $s$, for the purpose of preventing unnecessary strain or jar upon the chain or belt J caused by the irregularities of the ground over which the machine passes.

It will readily be seen that by the arrangement of mechanism above described the reel will be brought to bear in a proper position upon either short or tall grain; and when there is much unevenness in the standing grain the driver, while sitting in his seat, can easily and almost instantaneously raise or lower the reel to meet the requirements. Should the grain be very tall, as is often the case with rye, the reel may be raised higher by means of changing the rod $e$ to a connecting-point, $d$, on the slide B, provided for the purpose.

The mode and mechanism for elevating and depressing the reel for harvesters above described are shown on a front-cut machine. The same devices or their equivalents are equally well adapted to a rear-cut machine, and can be attached to any machine having a reel supported on a single post or having bearings only on one end.

What I claim as my invention, and desire to secure by Letters Patent, is—

1. The combination of the reel-post, the bracket attached thereto, the lifting-lever pivoted to the bracket, the connecting-link, and the reel-bearing, all these parts being constructed and operating substantially as set forth.

2. In combination with the above, the adjustable bar C with its friction-rollers and adjustable guide I, these parts being constructed and operating substantially as described.

JOHN MILLER.

Witnesses:
  H. F. WILLSON,
  A. ZOLLENS.